US012797292B2

(12) United States Patent
Li

(10) Patent No.: US 12,797,292 B2
(45) Date of Patent: Nov. 17, 2026

(54) HYDROTHERAPY MACHINE

(71) Applicant: Shenzhen HLE Photoelectric Science Technology Co., Ltd., Shenzhen (CN)

(72) Inventor: Wei Li, Shenzhen (CN)

(73) Assignee: Shenzhen HLE Photoelectric Science Technology Co., Ltd., Shenzhen (CN)

(*) Notice: Subject to any disclaimer, the term of this patent is extended or adjusted under 35 U.S.C. 154(b) by 132 days.

(21) Appl. No.: 18/941,670

(22) Filed: Nov. 8, 2024

(65) Prior Publication Data

US 2025/0152469 A1 May 15, 2025

(30) Foreign Application Priority Data

Nov. 14, 2023 (CN) ......................... 202323080756.5
Aug. 27, 2024 (CN) ......................... 202422098288.2

(51) Int. Cl.
*A61H 33/00* (2006.01)

(52) U.S. Cl.
CPC .. *A61H 33/0091* (2013.01); *A61H 2201/0111* (2013.01); *A61H 2201/0115* (2013.01); *A61H 2201/013* (2013.01); *A61H 2201/1215* (2013.01); *A61H 2203/02* (2013.01)

(58) Field of Classification Search
CPC ........ A61H 33/0091; A61H 2201/0111; A61H 2201/0115; A61H 2201/013; A61H 2201/1215; A61H 2203/02; A61H 9/00; A61H 33/00; A61H 33/02; A47K 3/00; A47K 3/10; A47K 3/02; E04H 4/00; E03C 1/00; F16K 31/00
See application file for complete search history.

(56) References Cited

U.S. PATENT DOCUMENTS 2,336,127 A * 12/1943 Rocke ................ A61H 33/0091
68/183
2,730,095 A * 1/1956 Scott ....................... F04D 9/041
415/121.2
3,043,296 A * 7/1962 Gregory ............... A61H 33/025
601/168

(Continued)

FOREIGN PATENT DOCUMENTS

CN 103816034 A * 5/2014 ............. A61H 9/005
CN 205533294 U * 8/2016 ............. A61H 9/005

(Continued)

*Primary Examiner* — Lori L Baker

(57) ABSTRACT

A hydrotherapy machine includes an outer shell, a drive component, and a waterproof inner container. The outer shell is provided with a first accommodating cavity, a first water inlet, and a first water outlet. The first accommodating cavity, the first water inlet, and the first water outlet are in communication with each other. The drive component includes a control motherboard, a power supply, a drive motor, and a fan blade. The power supply is electrically connected to the drive motor. The drive motor is provided with a drive shaft. The fan blade is sleeved on the drive shaft, so that the drive motor drives the fan blade to rotate through rotation of the drive shaft. The waterproof inner container is positioned inside the first accommodating cavity. The waterproof inner container is provided with a sealed second accommodating cavity and a first installation opening in communication with the second accommodating cavity.

20 Claims, 11 Drawing Sheets

(56) References Cited

U.S. PATENT DOCUMENTS

| | | | | | |
|---|---|---|---|---|---|
| 3,835,846 | A * | 9/1974 | Kurtz | A61H 33/6026 | 601/167 |
| 3,886,936 | A * | 6/1975 | Wehrenberg | A61H 33/0087 | 4/546 |
| 4,340,982 | A * | 7/1982 | Hart | A61H 33/02 | 4/492 |
| 4,726,080 | A * | 2/1988 | Henkin | A61H 33/6052 | 4/DIG. 9 |
| 4,858,255 | A * | 8/1989 | Haisman | A61H 33/02 | 4/541.4 |
| 4,860,392 | A * | 8/1989 | Gardenier | A61H 33/027 | 4/492 |
| 5,418,984 | A * | 5/1995 | Livingston, Jr. | A61H 33/6073 | 601/154 |
| 5,540,651 | A * | 7/1996 | Risch | A61H 9/0021 | 601/149 |
| 5,848,444 | A * | 12/1998 | Christopherson | F16L 27/11 | 239/587.3 |
| 6,073,277 | A * | 6/2000 | Banks | A61H 33/025 | 4/579 |
| 6,357,060 | B2 * | 3/2002 | Gloodt | A47K 3/10 | 210/764 |
| 6,405,387 | B1 * | 6/2002 | Barnes | A61H 33/0087 | 4/541.1 |
| 6,760,932 | B1 * | 7/2004 | Maiuccoro | A61H 33/027 | 4/541.4 |
| 8,505,575 | B2 * | 8/2013 | Chen | A61H 33/02 | 137/565.17 |
| 12,569,400 | B2 * | 3/2026 | Brennan | A61H 33/6005 | |
| 2001/0027573 | A1 * | 10/2001 | Gloodt | A47K 3/10 | 4/541.1 |
| 2002/0151830 | A1 * | 10/2002 | Kahn | A61H 33/60 | 601/158 |
| 2004/0034918 | A1 * | 2/2004 | Loyd | A61H 33/60 | 4/541.1 |
| 2004/0261171 | A1 * | 12/2004 | Holtsnider | A61H 33/027 | 4/541.6 |
| 2005/0120473 | A1 * | 6/2005 | Southon | A61H 33/6047 | 4/541.6 |
| 2005/0203447 | A1 * | 9/2005 | Pisani | A61H 9/00 | 601/55 |
| 2005/0210575 | A1 * | 9/2005 | Erb | A61H 33/02 | 4/541.1 |
| 2006/0230518 | A1 * | 10/2006 | Holtsnider | A61H 33/027 | 4/541.6 |
| 2007/0107789 | A1 * | 5/2007 | Reck | F16K 11/0873 | 137/887 |
| 2008/0021378 | A1 * | 1/2008 | Johnson | A61M 3/0233 | 604/30 |
| 2009/0158518 | A1 * | 6/2009 | Southon | A61H 33/6047 | 204/667 |
| 2012/0085442 | A1 * | 4/2012 | Chen | A61H 33/60 | 137/565.36 |
| 2019/0085576 | A1 * | 3/2019 | Lin | A61H 33/0095 | |
| 2019/0358374 | A1 * | 11/2019 | White | A61M 1/92 | |
| 2020/0276076 | A1 * | 9/2020 | Lunter | A61H 9/0021 | |

FOREIGN PATENT DOCUMENTS

| | | | | | |
|---|---|---|---|---|---|
| CN | 106562724 | A | * | 4/2017 | G01G 19/52 |
| CN | 113123414 | A | * | 7/2021 | E03D 11/02 |
| CN | 114135694 | A | * | 3/2022 | F16K 17/04 |
| CN | 114135695 | A | * | 3/2022 | F16K 17/30 |
| CN | 216715306 | U | * | 6/2022 | A61H 9/005 |
| CN | 115252394 | A | * | 11/2022 | A61H 9/005 |
| CN | 115929926 | A | * | 4/2023 | A61H 9/005 |
| CN | 219250889 | U | * | 6/2023 | A61H 7/005 |
| CN | 118806582 | A | * | 10/2024 | A61H 23/02 |
| DE | 3742432 | C2 | * | 10/2001 | A61H 33/6078 |
| DE | 102015118938 | A1 | * | 5/2017 | A61H 33/02 |
| EP | 1913925 | B1 | * | 4/2012 | A61H 33/6026 |
| EP | 3021721 | B1 | * | 9/2020 | A61H 33/02 |
| FR | 2886662 | A1 | * | 12/2006 | A61H 33/60 |
| JP | 2007029197 | A | * | 2/2007 | A61H 9/005 |
| JP | 2025176440 | A | * | 12/2025 | A61H 9/005 |
| TW | 202045117 | A | * | 12/2020 | A61H 37/00 |
| WO | WO-0037018 | A2 | * | 6/2000 | A61H 33/6052 |
| WO | WO-0038560 | A1 | * | 7/2000 | A61H 33/6036 |
| WO | WO-0145631 | A2 | * | 6/2001 | A61H 33/6068 |
| WO | WO-2005031200 | A1 | * | 4/2005 | F16K 5/0605 |
| WO | WO-2006050083 | A2 | * | 5/2006 | A61H 9/0071 |
| WO | WO-2006096545 | A2 | * | 9/2006 | A61H 9/00 |
| WO | WO-2007006947 | A1 | * | 1/2007 | A61H 33/601 |
| WO | WO-2007006948 | A1 | * | 1/2007 | A61H 33/601 |
| WO | WO-2018186565 | A1 | * | 10/2018 | A61H 15/0078 |
| WO | WO-2022242467 | A1 | * | 11/2022 | E03D 11/02 |

* cited by examiner

HYDROTHERAPY MACHINE

CROSS-REFERENCE TO RELATED APPLICATIONS

The application claims priority of Chinese patent application CN2023230807565, filed on Nov. 14, 2023, which is incorporated herein by reference in its entireties; the application also claims priority of Chinese patent application CN2024220982882, filed on Aug. 27, 2024, which is incorporated herein by reference in its entireties.

TECHNICAL FIELD

The present invention relates to the field of hydrotherapy, particularly to a hydrotherapy machine.

BACKGROUND ART

SPA massage and health bath with strong hydraulic power can relax the muscles and bones of the whole body to relieve stress, and massage acupoints throughout the body at the same time, so as to help to open up the meridians of the human body to achieve exercise effects, promote health, and easily eliminate fatigue from the day. However, existing hydrotherapy machines on the market often need to be immersed in water for a long time to work, which often causes short circuits and corrosion of the electronic components of the hydrotherapy machine due to water infiltration into internal electronics. This not only shortens the service life of the hydrotherapy machine, but also poses great safety hazards.

SUMMARY

In order to overcome the shortcomings of the prior art, a hydrotherapy machine is provided in the present invention. The hydrotherapy machine includes:

an outer shell, wherein the outer shell is provided with a first accommodating cavity, a first water inlet, and a first water outlet; and the first accommodating cavity, the first water inlet, and the first water outlet are in communication with each other;

a drive component, wherein the drive component includes a control motherboard, a power supply, a drive motor, and a fan blade; the power supply is electrically connected to the drive motor; the drive motor is provided with a drive shaft, and the fan blade is sleeved on the drive shaft, so that the drive motor drives the fan blade to rotate through rotation of the drive shaft, so as to drive water to pass through the first water inlet and the first water outlet in sequence to form a water flow for hydrotherapy;

a waterproof inner container, wherein the waterproof inner container is positioned inside the first accommodating cavity, and the waterproof inner container is provided with a sealed second accommodating cavity and a first installation opening in communication with the second accommodating cavity; the power supply and the drive motor are both positioned inside the waterproof inner container; and the drive shaft of the drive motor is threaded out of the second accommodating cavity through the first installation opening to be connected to the fan blade; and a first sealing member, wherein the first sealing member is positioned between the drive shaft and the first installation opening to seal a gap between the drive shaft and the first installation opening.

As an improvement of the present invention, the hydrotherapy machine further includes a flexible button panel. A pressing portion is provided on the button panel. The waterproof inner container is also provided with a second installation opening. The control motherboard is positioned at the second installation opening, and a button is provided on the control motherboard. The pressing portion is positioned above the button, and the button panel is used for sealing the second installation opening.

As an improvement of the present invention, the hydrotherapy machine further includes a magnetic attraction charging head and a second sealing member. The magnetic attraction charging head is electrically connected to the power supply, the control motherboard, and the drive motor. The waterproof inner container is also provided with a third installation opening, and the magnetic attraction charging head is installed in the third installation opening. The second sealing member is provided between the magnetic attraction charging head and an inner wall of the third installation opening to press and seal a gap between the magnetic attraction charging head and the inner wall of the third installation opening. The outer shell is provided with a charging opening. The charging opening is oriented towards the magnetic attraction charging head. The magnetic attraction charging head is capable of being connected to an external power supply through the charging opening.

As an improvement of the present invention, the hydrotherapy machine further includes a button bracket. The button panel is provided with a positioning protrusion, and the button bracket is provided with a positioning groove. The positioning protrusion is connected to the positioning groove, and the button bracket is positioned between the button panel and the control motherboard. A restoration gap is defined between the button panel and the button bracket.

As an improvement of the present invention, stop protrusions are provided on both sides of an inner wall of the second installation opening, and stop grooves are defined in both sides of the button panel. The stop protrusions are connected to the stop grooves, and the stop protrusions stop the stop grooves in the second installation opening to stop the button panel in the second installation opening.

As an improvement of the present invention, the outer shell further includes a water flow channel. A first side of the water flow channel is provided with a second water outlet, and a second side of the water flow channel is provided with a second water inlet. The first water inlet, the first accommodating cavity, the second water inlet, the water flow channel, the second water outlet, and the first water outlet are in communication sequentially. The fan blade is disposed between the second water inlet and the second water outlet.

As an improvement of the present invention, the water flow channel includes a first part and a second part. The first part is connected to the waterproof inner container, and the second water inlet is positioned in the first part. The first part is also provided with a third water outlet. A first end of the second part is connected to the third water outlet, a second end of the second part is connected to the first water outlet, and the second water outlet is positioned at the second end of the second part, so that the first water inlet, the first accommodating cavity, the second water inlet, the first part, the third water outlet, the second part, the second water outlet, and the first water outlet are in communication sequentially. The fan blade is positioned inside the first part, and the drive shaft of the motor is connected to the fan blade through the second water inlet.

As an improvement of the present invention, the second part is connected to the third water outlet through a connecting pipe.

As an improvement of the present invention, the hydrotherapy machine further includes an installation bracket, and the second part is connected to the outer shell through the installation bracket. The hydrotherapy machine further includes a nozzle with a relatively narrow front portion and a relatively wide back portion. The nozzle is positioned at the first water outlet, and the installation bracket and an inner wall of the first water outlet clamp the nozzle. A front end of the nozzle is provided with a water spray opening, and a rear end of the nozzle is provided with a third water inlet. The second water outlet of the second part is provided in the third water inlet through the installation bracket, so that the first water inlet, the first accommodating cavity, the second water inlet, the first part, the third water outlet, the second part, the second water outlet, the third water inlet, and the water spray opening are in communication sequentially.

As an improvement of the present invention, the first part includes a bottom shell and an upper shell. The bottom shell is connected to the waterproof inner container, and the second water inlet is provided on the upper shell. The bottom shell is provided with an installation chamber, and the fan blade is installed in the installation chamber. The bottom shell is also provided with a third installation opening, and the upper shell detachably covers the third installation opening.

Beneficial effects of the present invention are as follows. The hydrotherapy machine is provided in the present invention. The hydrotherapy machine includes the outer shell, the drive component, the waterproof inner container, and the first sealing member. The outer shell is provided with the first accommodating cavity, the first water inlet, and the first water outlet. The first accommodating cavity, the first water inlet, and the first water outlet are in communication with each other. The drive component includes the control motherboard, the power supply, the drive motor, and the fan blade. The power supply is electrically connected to the drive motor. The drive motor is provided with the drive shaft, and the fan blade is sleeved on the drive shaft, so that the drive motor drives the fan blade to rotate through the rotation of the drive shaft, so as to drive water to pass through the first water inlet and the first water outlet in sequence to form the water flow for hydrotherapy. The waterproof inner container is positioned inside the first accommodating cavity, and the waterproof inner container is provided with the sealed second accommodating cavity and the first installation opening in communication with the second accommodating cavity. The power supply, the drive motor, and the control motherboard are all positioned inside the waterproof inner container. The drive shaft of the drive motor is threaded out of the second accommodating cavity through the first installation opening to be connected to the fan blade. The first sealing member is positioned between the drive shaft and the first installation opening to seal the gap between the drive shaft and the first installation opening. Therefore, the hydrotherapy machine can relax muscles and bones of a whole body to relieve pressure, and massage acupoints throughout the body at the same time, so as to help to open up meridians of the human body to achieve exercise effects, promote health, and easily eliminate fatigue for the day. At the same time, the hydrotherapy machine can drive water in a bathtub to flow. When substances such as fragrance or shower gel are placed in the bathtub, the substances such as fragrance or shower gel can be helped to bubble, and a user's enjoyment during bathing can be increased. Moreover, since the power supply, the drive motor, and the control motherboard and other electronic components of the hydrotherapy machine are all positioned inside the waterproof inner container, when the hydrotherapy machine is placed in the water in the bathtub and works for a long time, the water can be prevented from seeping into the power supply, the drive motor, and the control motherboard and other electronic components of the hydrotherapy machine to prevent the hydrotherapy machine from short circuits. This not only greatly improves the service life of the hydrotherapy machine, but also makes it safer to use. Furthermore, due to the power supply inside the hydrotherapy machine supplying power to the drive motor, the hydrotherapy machine can be used normally even without an external power supply, meeting needs of the user for different usage scenarios.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
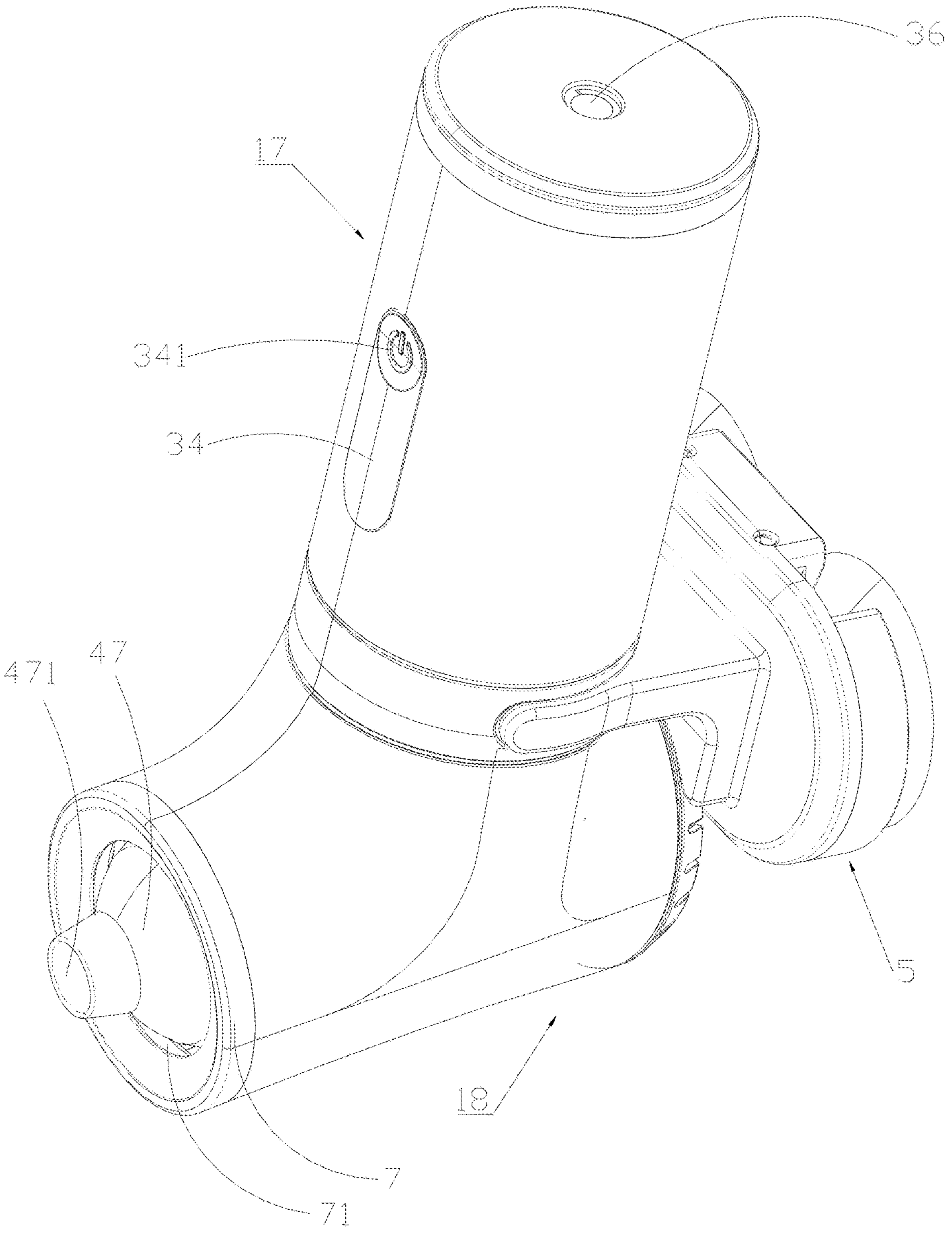
FIG. 1 is a schematic diagram of an overall structure of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
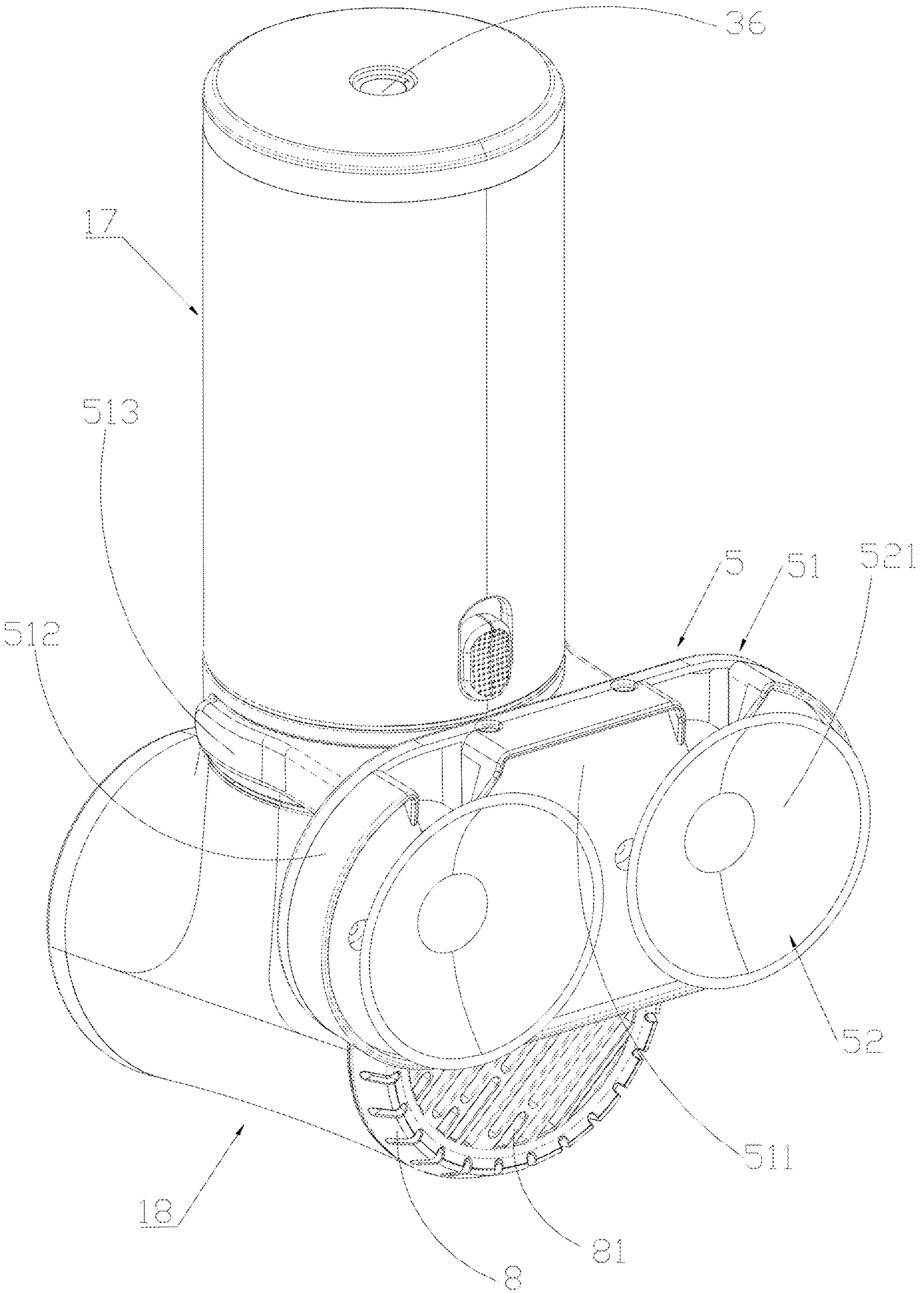
FIG. 2 is another schematic diagram of an overall structure of the present invention.
Figure 3:
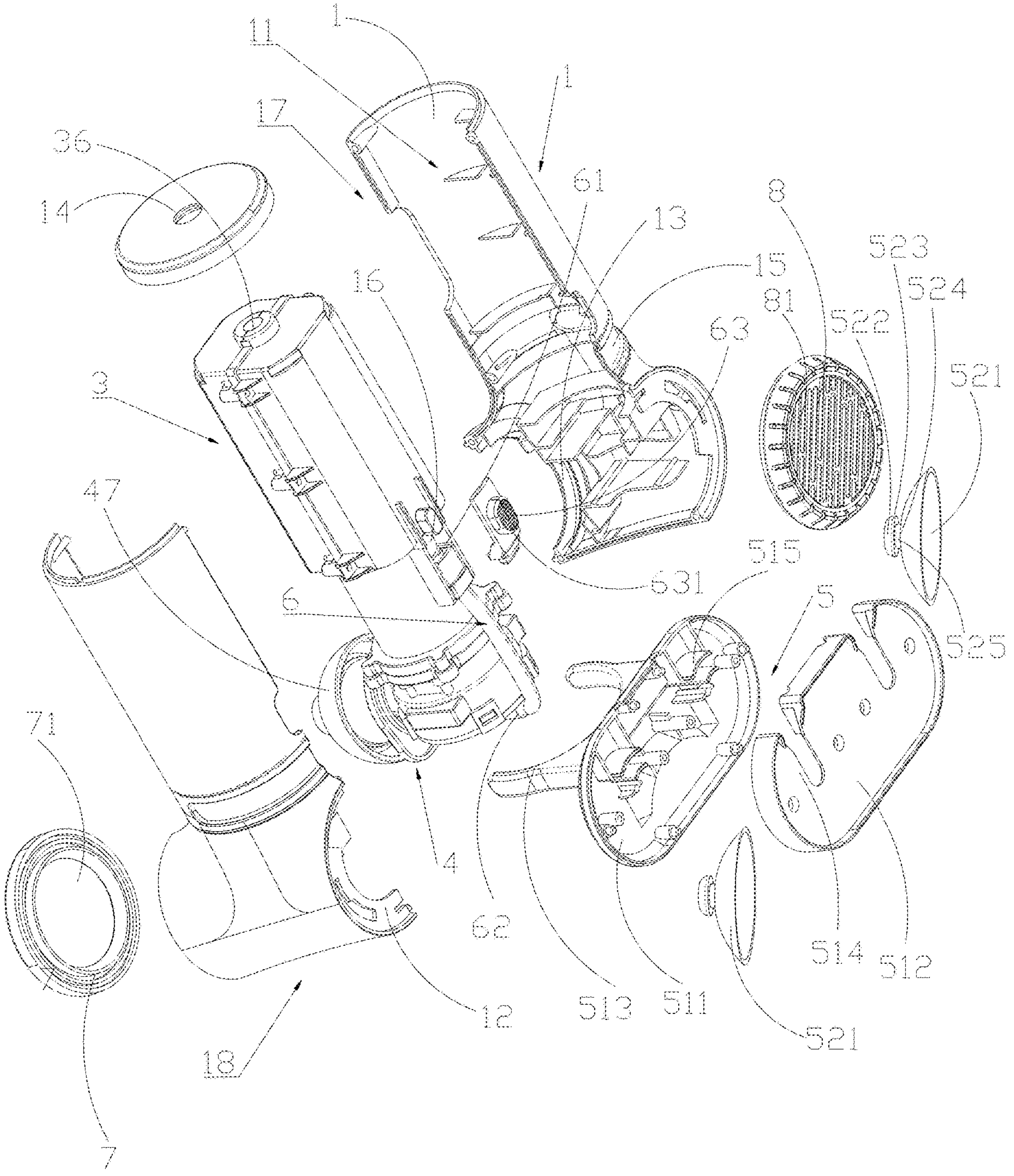
FIG. 3 is an exploded view of the present invention.
Figure 4:
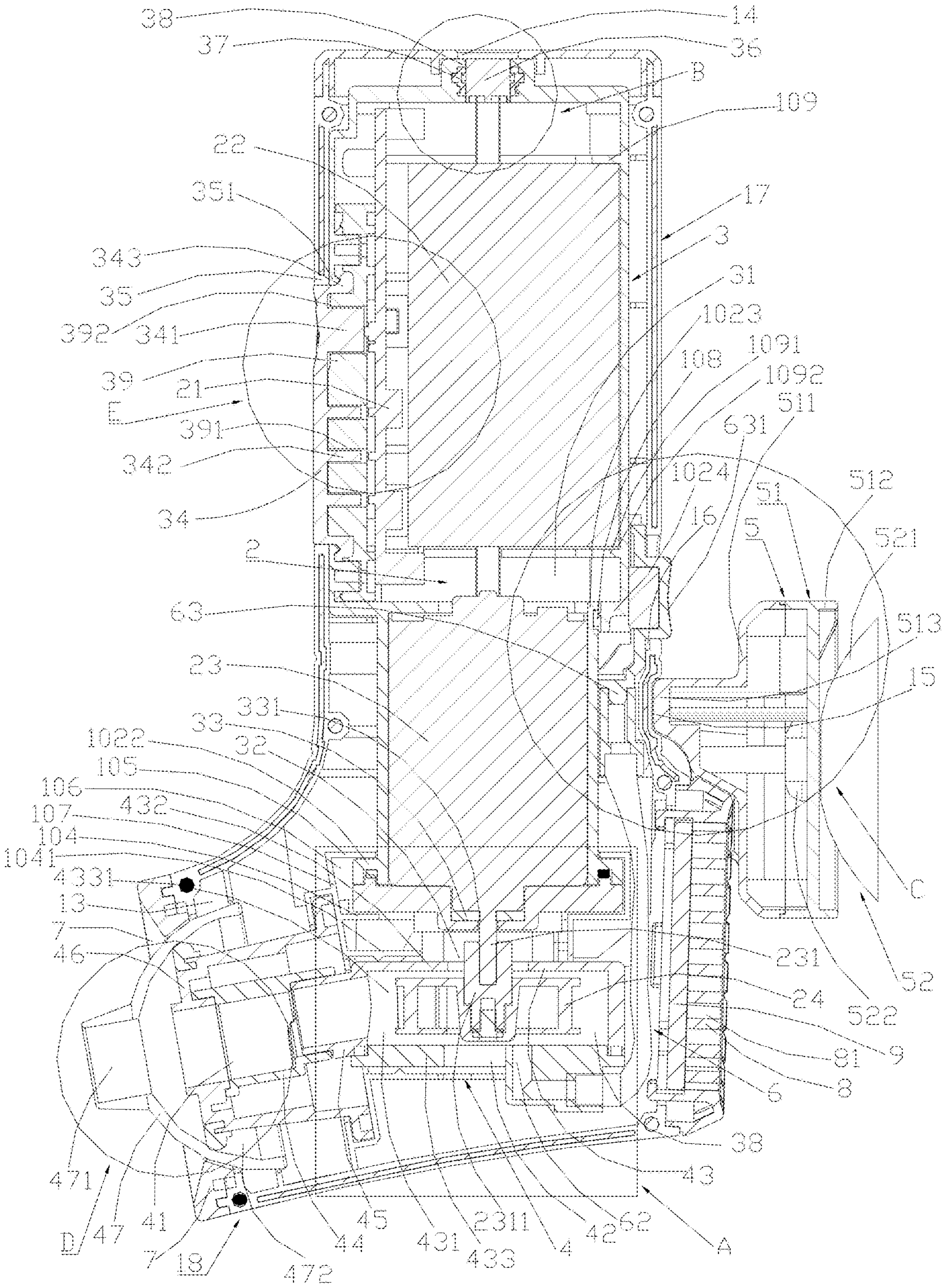
FIG. 4 is a sectional view of a waterproof inner container, a water flow channel, a connecting bracket, and an airflow channel.
Figure 5:
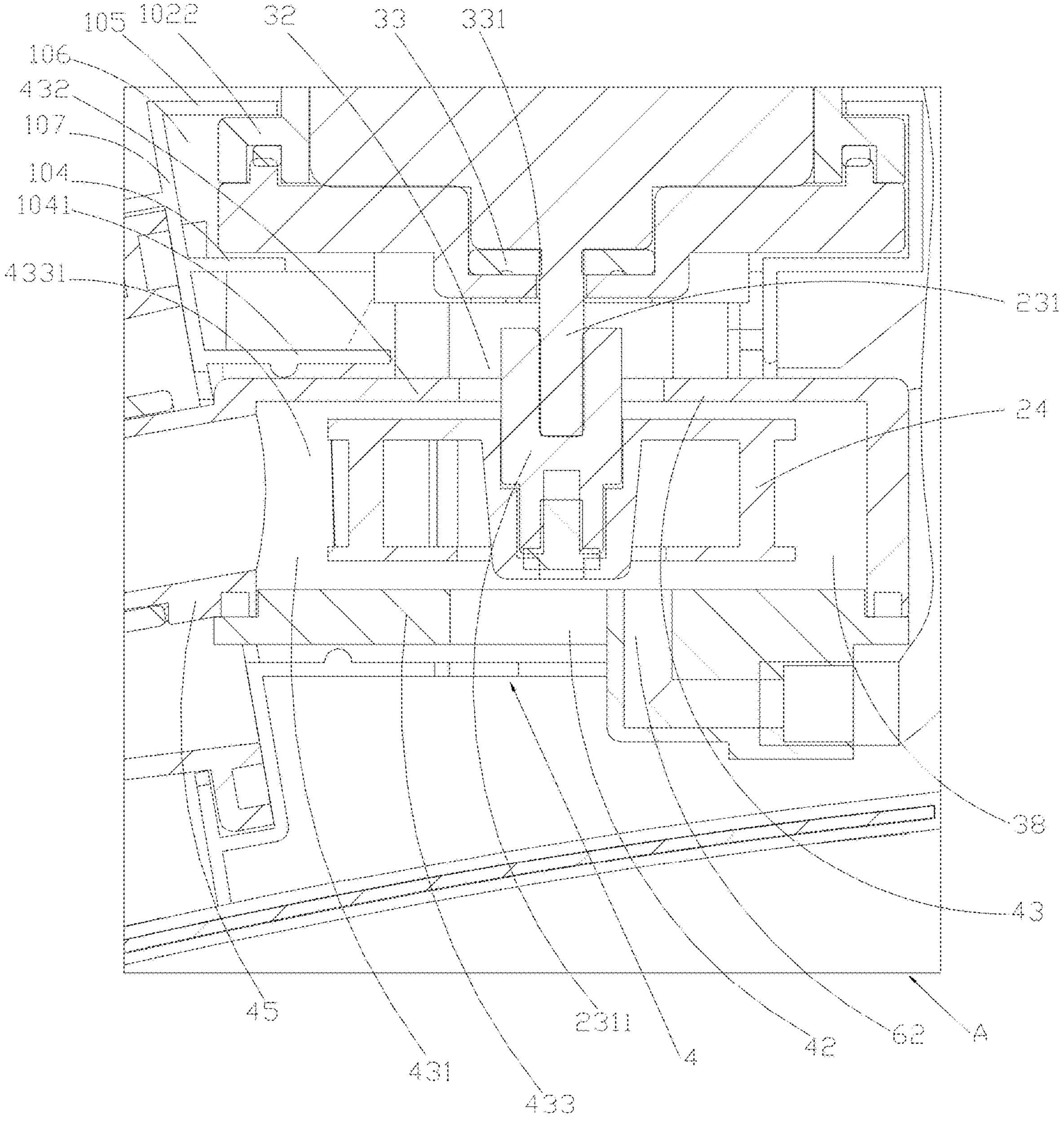
FIG. 5 is an enlarged view of area A in FIG. 4.
Figure 6:
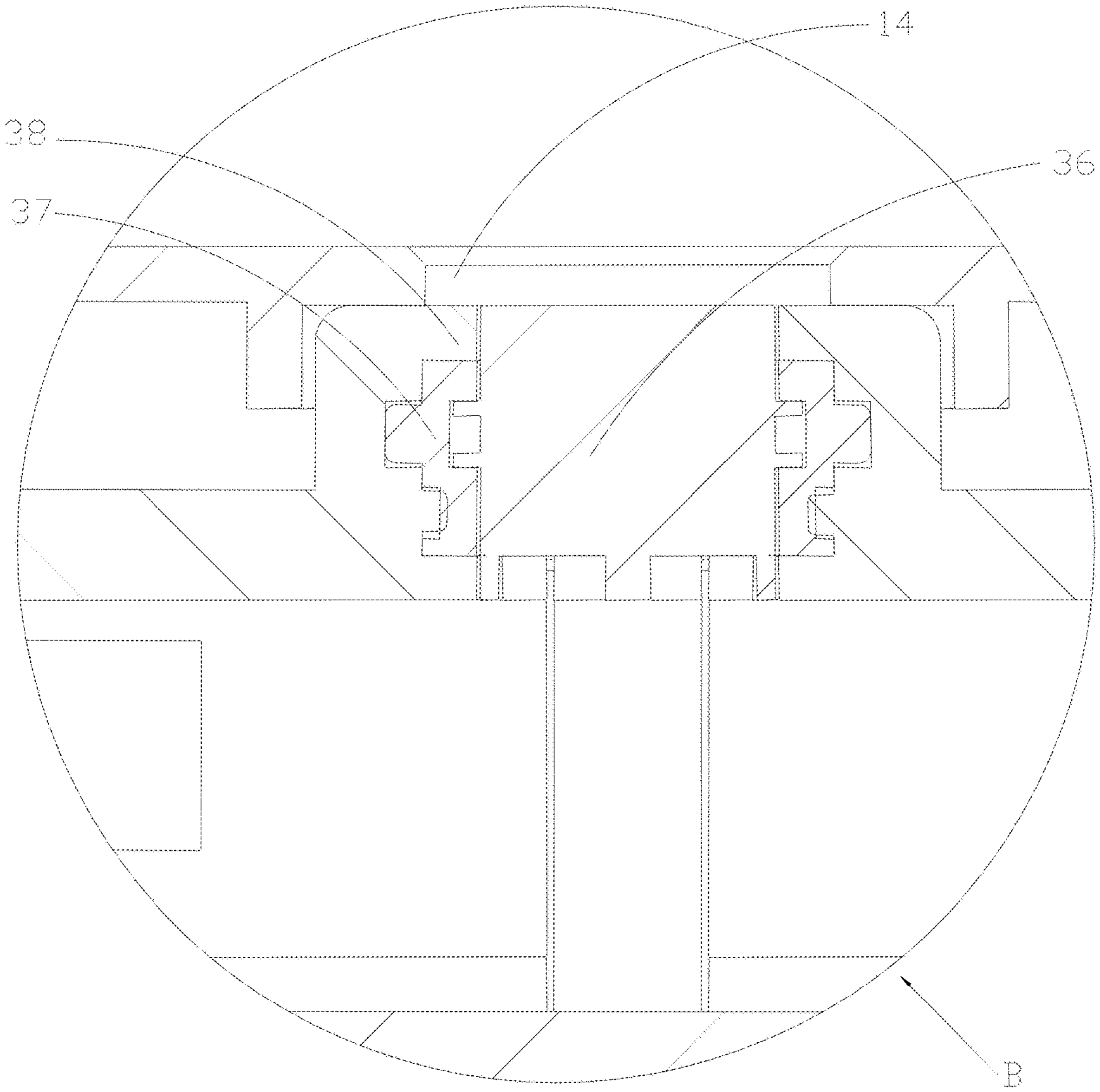
FIG. 6 is an enlarged view of area B in FIG. 4.
Figure 7:
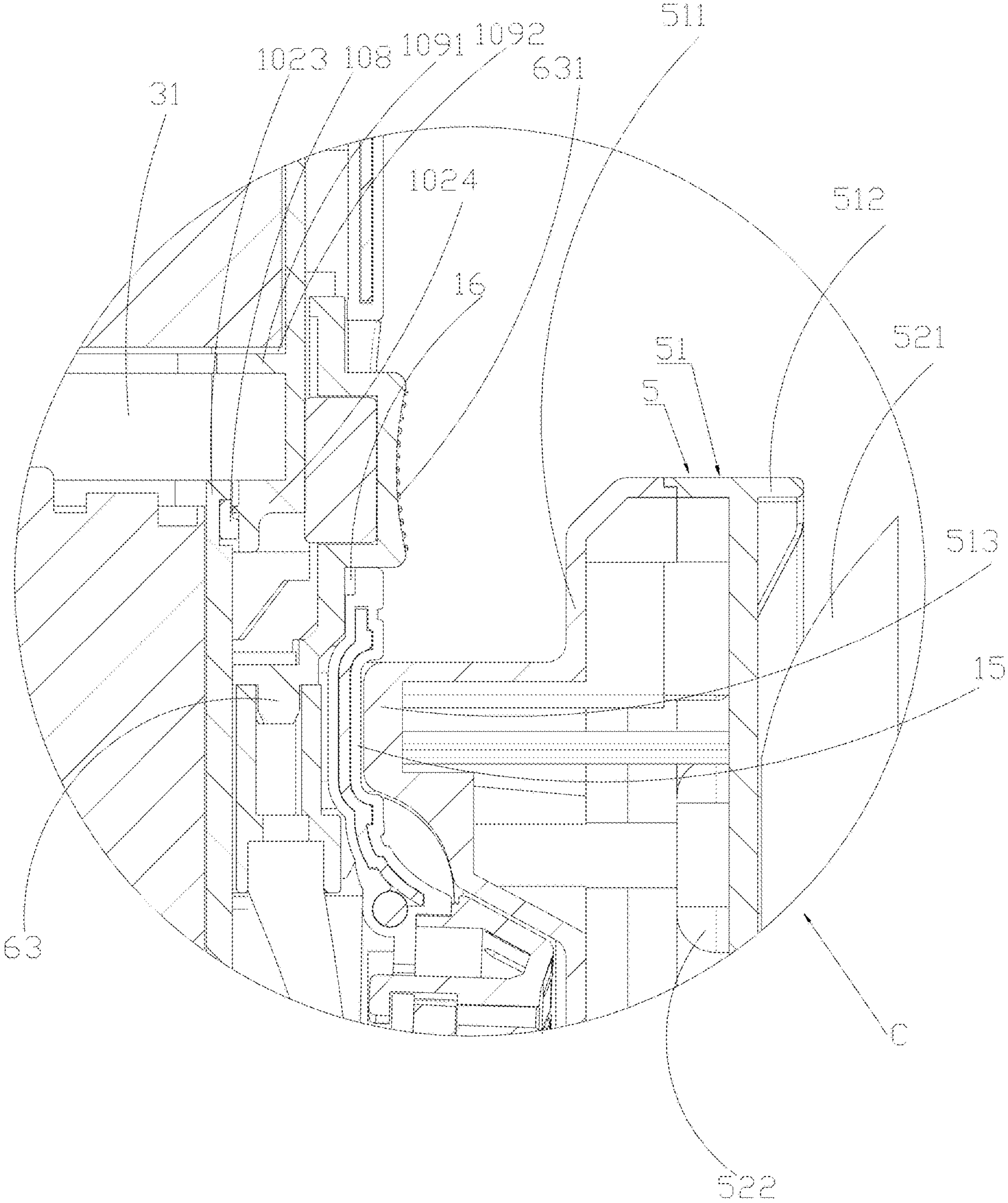
FIG. 7 is an enlarged view of area C in FIG. 4.
Figure 8:
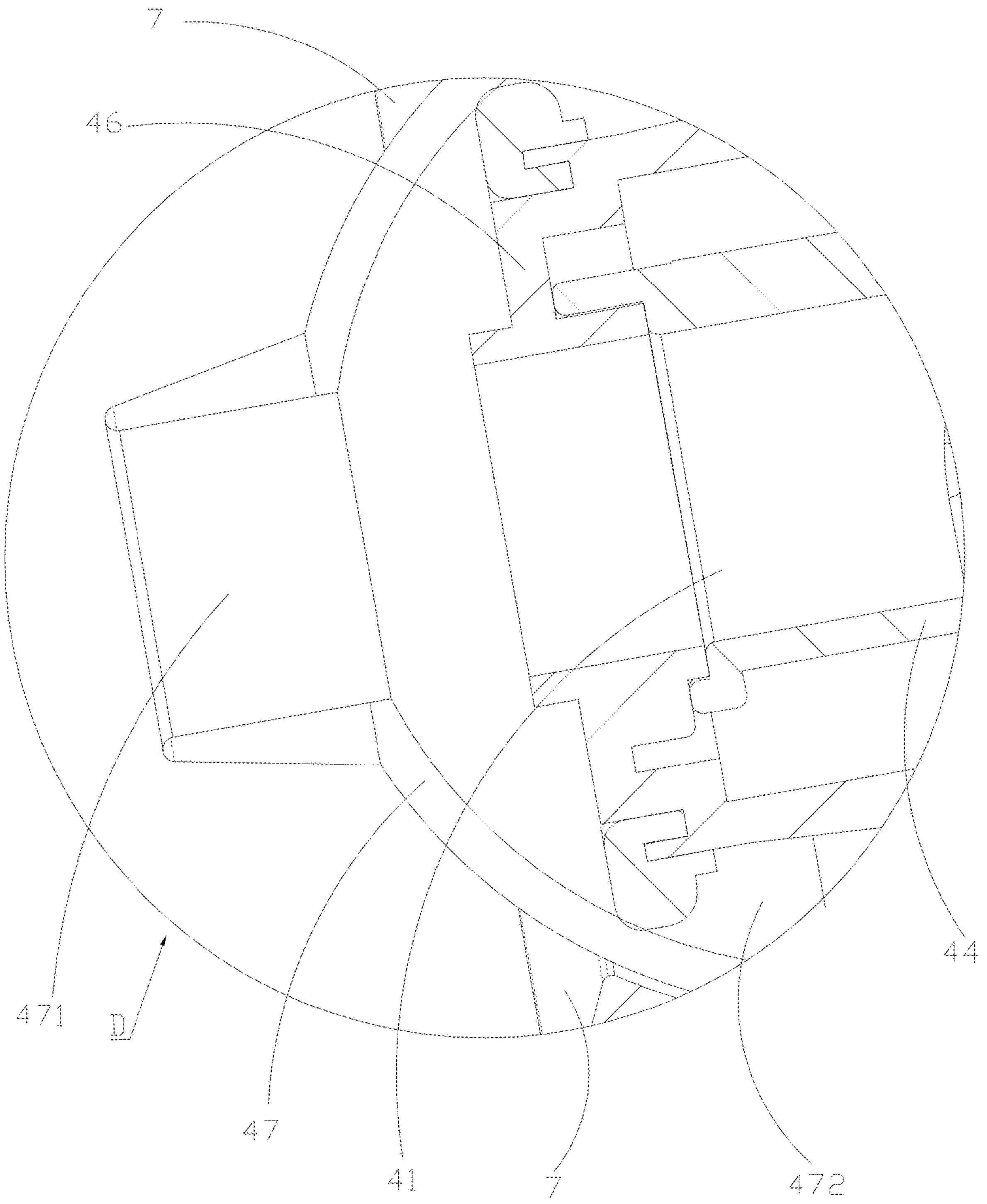
FIG. 8 is an enlarged view of area D in FIG. 4.
Figure 9:
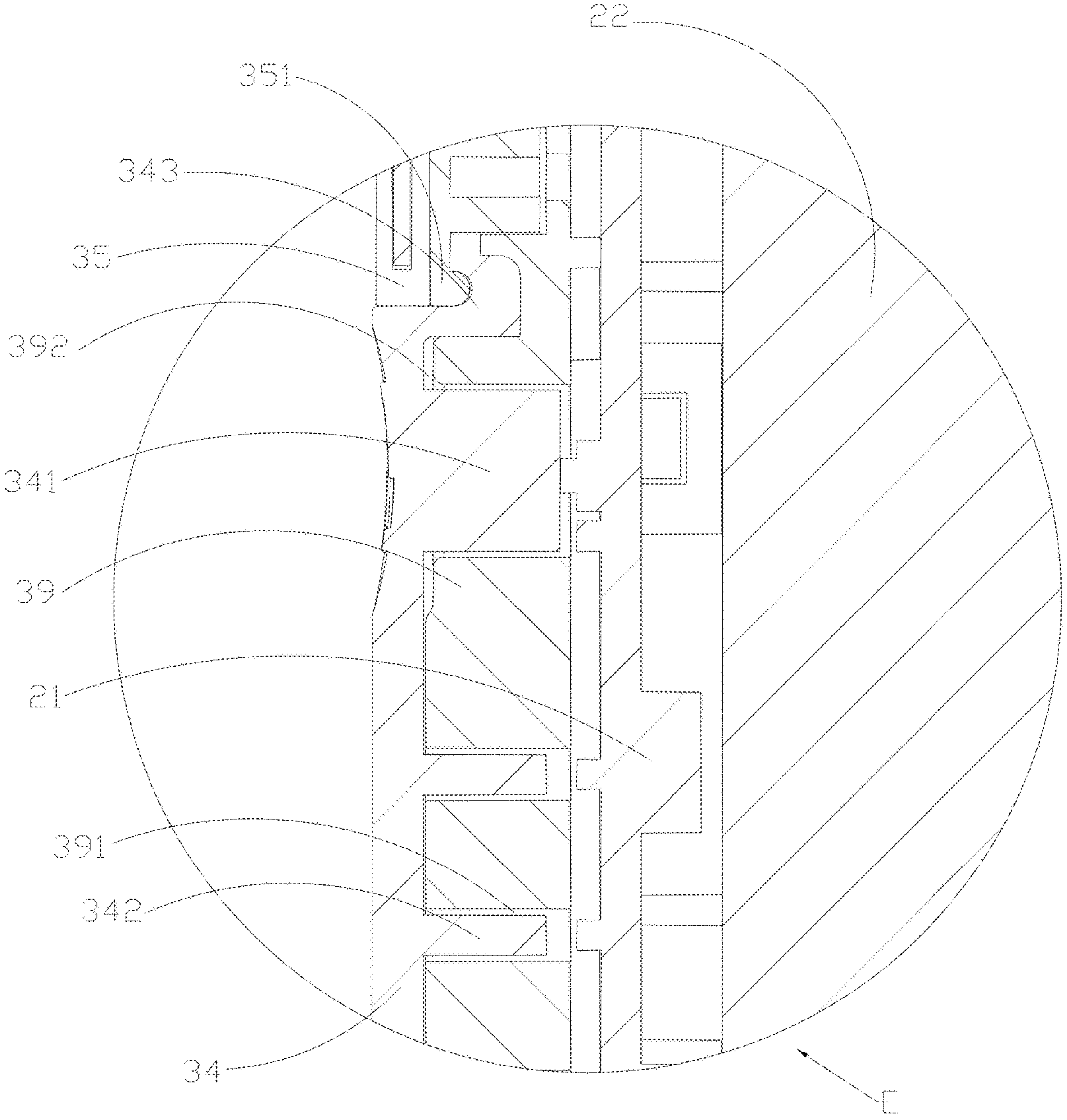
FIG. 9 is an enlarged view of area E in FIG. 4.
Figure 10:
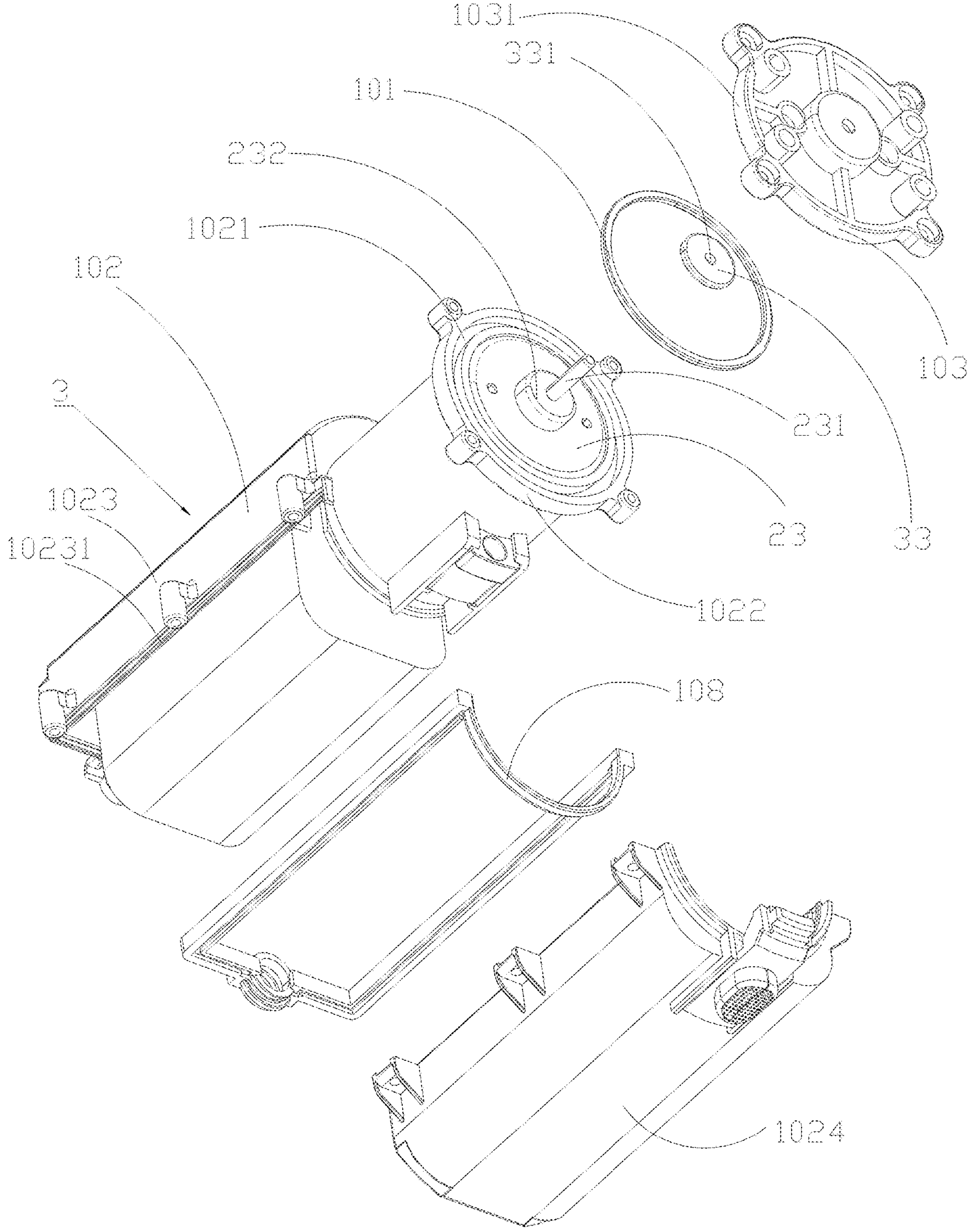
FIG. 10 is an exploded view of a waterproof inner container.
Figure 11:
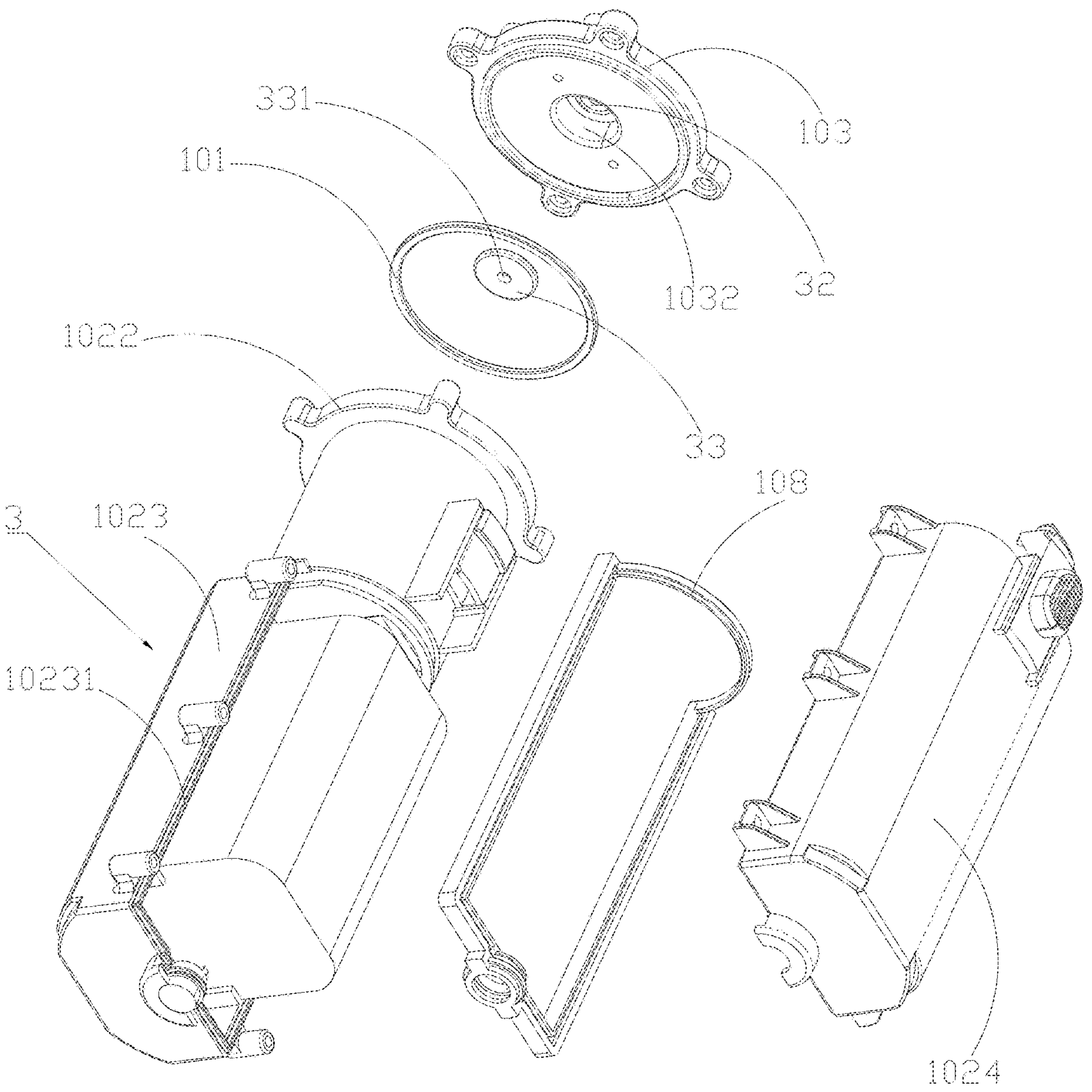
FIG. 11 is another exploded view of a waterproof inner container.

Referring to FIGS. 1-11, a hydrotherapy machine includes:

- an outer shell 1, wherein the outer shell 1 is provided with a first accommodating cavity 11, a first water inlet 12, and a first water outlet 13; and the first accommodating cavity 11, the first water inlet 12, and the first water outlet 13 are in communication with each other;
- a drive component 2, wherein the drive component 2 includes a control motherboard 21, a power supply 22, a drive motor 23, and a fan blade 24; the power supply 22 is electrically connected to the drive motor 23; the drive motor 23 is provided with a drive shaft 231, and the fan blade 24 is sleeved on the drive shaft 231, so that the drive motor 23 drives the fan blade 24 to rotate through rotation of the drive shaft 231, so as to drive water to pass through the first water inlet 12 and the first water outlet 13 in sequence to form a water flow for hydrotherapy;
- a waterproof inner container 3, wherein the waterproof inner container 3 is positioned inside the first accommodating cavity 11, and the waterproof inner container 3 is provided with a sealed second accommodating cavity 31 and a first installation opening 32 in communication with the second accommodating cavity 31; the power supply 22, the drive motor 23, and the control motherboard 21 are all positioned inside the waterproof inner container 3; and the drive shaft 231 of the drive motor 23 is threaded out of the second accommodating cavity 31 through the first installation opening 32 to be connected to the fan blade 24; and
- a first sealing member 33, wherein the first sealing member 33 is positioned between the drive shaft 231 and the first installation opening 32 to seal a gap between the drive shaft 231 and the first installation opening 32.

Through the above structure, the hydrotherapy machine includes the outer shell 1, the drive component 2, the waterproof inner container 3, and the first sealing member 33. The outer shell 1 is provided with the first accommodating cavity 11, the first water inlet 12, and the first water outlet 13. The first accommodating cavity 11, the first water inlet 12, and the first water outlet 13 are in communication with each other. The drive component 2 includes the control motherboard 21, the power supply 22, the drive motor 23, and the fan blade 24. The power supply 22 is electrically connected to the drive motor 23. The drive motor 23 is provided with the drive shaft 231, and the fan blade 24 is sleeved on the drive shaft 231, so that the drive motor 23 drives the fan blade 24 to rotate through the rotation of the drive shaft 231, so as to drive water to pass through the first water inlet 12 and the first water outlet 13 in sequence to form the water flow for hydrotherapy. The waterproof inner container 3 is positioned inside the first accommodating cavity 11, and the waterproof inner container 3 is provided with the sealed second accommodating cavity 31 and the first installation opening 32 in communication with the second accommodating cavity 31. The power supply 22, the drive motor 23, and the control motherboard 21 are all positioned inside the waterproof inner container 3. The drive shaft 231 of the drive motor 23 is threaded out of the second accommodating cavity 31 through the first installation opening 32 to be connected to the fan blade 24. The first sealing member 33 is positioned between the drive shaft 231 and the first installation opening 32 to seal the gap between the drive shaft 231 and the first installation opening 32. Therefore, the hydrotherapy machine can relax muscles and bones of a whole body to relieve pressure, and massage acupoints throughout the body at the same time, so as to help to open up meridians of the human body to achieve exercise effects, promote health, and easily eliminate fatigue for the day. At the same time, the hydrotherapy machine can drive water in a bathtub to flow. When substances such as fragrance or shower gel are placed in the bathtub, the fragrance or the shower gel can be helped to bubble, and a user's enjoyment during bathing can be increased. Moreover, since the power supply 22, the drive motor 23, the control motherboard 21 and other electronic components of the hydrotherapy machine are all positioned inside the waterproof inner container 3, when the hydrotherapy machine is placed in the water in the bathtub and works for a long time, water can be prevented from seeping into the power supply 22, the drive motor 23, the control motherboard 21 and other electronic components of the hydrotherapy machine to prevent the hydrotherapy machine from short circuits. This not only greatly improves the service life of the hydrotherapy machine, but also makes it safer to use. Furthermore, due to the power supply 22 inside the hydrotherapy machine supplying power to the drive motor 23, the hydrotherapy machine can be used normally even without an external power supply, meeting needs of the user for different usage scenarios.

In this embodiment, the hydrotherapy machine further includes a flexible button panel 34. A pressing portion 341 is provided on the button panel 34. The waterproof inner container 3 is also provided with a second installation opening 35. The control motherboard 21 is positioned at the second installation opening 35, and a button is provided on the control motherboard 21. The pressing portion 341 is positioned above the button, and the button panel 34 is used for sealing the second installation opening 35. The hydrotherapy machine further includes a button bracket 39. The button panel 34 is provided with a positioning protrusion 342, and the button bracket 39 is provided with a positioning groove 391. The positioning protrusion 342 is connected to the positioning groove 391, and the button bracket 39 is positioned between the button panel 34 and the control motherboard 21. A restoration gap 392 is defined between the button panel 34 and the button bracket 39. Specifically, stop protrusions 351 are provided on both sides of an inner wall of the second installation opening 35, and stop grooves 343 are defined in both sides of the button panel 34. The stop protrusions 351 are connected to the stop grooves 343, and the stop protrusions 351 stop the stop grooves 343 in the second installation opening 35 to stop the button panel 34 in the second installation opening 35. Through the above structure, the user can press the pressing part 341 in the button panel 34 to control and adjust power of a power supply of the drive motor 23 to achieve water flow output of different levels, so as to adjust the strength of hydrotherapy. Moreover, since the button panel 34 seals the second installation opening 35, the waterproof strength of the hydrotherapy machine is further improved.

In this embodiment, the hydrotherapy machine further includes a magnetic attraction charging head 36 and a second sealing member 37. The magnetic attraction charging head 36 is electrically connected to the power supply 22, the control motherboard 21, and the drive motor 23. The waterproof inner container 3 is also provided with a third installation opening 38, and the magnetic attraction charging head 36 is installed in the third installation opening 38. The second sealing member 37 is provided between the magnetic attraction charging head 36 and an inner wall of the third installation opening 38 to press and seal a gap between the magnetic attraction charging head 36 and the inner wall of the third installation opening 38. The outer shell 1 is provided with a charging opening 14. The charging opening 14 is oriented towards the magnetic attraction charging head 36. The magnetic attraction charging head 36 is capable of being connected to an external power supply through the charging opening 14. Through the above structure, the user can connect the magnetic attraction charging head 36 to the external power supply through the charging opening 14 to charge the power supply 22 of the hydrotherapy machine. Additionally, since the second sealing member 37 seals the gap between the magnetic attraction charging head 36 and the third installation opening 38, the waterproof strength of the hydrotherapy machine is further enhanced.

In this embodiment, the outer shell 1 further includes a water flow channel 4. A first side of the water flow channel 4 is provided with a second water outlet 41, and a second side of the water flow channel 4 is provided with a second water inlet 42. The first water inlet 12, the first accommodating cavity 11, the second water inlet 42, the water flow channel 4, the second water outlet 41, and the first water outlet 13 are in communication sequentially. The fan blade 24 is disposed between the second water inlet 42 and the second water outlet 41. The water flow channel 4 includes a first part 43 and a second part 44. The first part 43 is connected to the waterproof inner container 3, and the second water inlet 42 is positioned in the first part 43. The first part 43 is also provided with a third water outlet 431. A first end of the second part 44 is connected to the third water outlet 431, a second end of the second part 44 is connected to the first water outlet 13, and the second water outlet 41 is positioned at the second end of the second part 44, so that the first water inlet 12, the first accommodating cavity 11, the second water inlet 42, the first part 43, the third water outlet 431, the second part 44, the second water outlet 41, and the first water outlet 13 are in communication sequentially. The fan blade 24 is positioned inside the first part 43, and the drive shaft 231 of the motor is connected to the fan blade 24 through the second water inlet 42. Specifically, the second part 44 is connected to the third water outlet 431 through a connecting pipe 45. Furthermore, the hydrotherapy machine further includes an installation bracket 46, and the second part 44 is connected to the outer shell 1 through the installation bracket 46. The hydrotherapy machine further includes a nozzle 47 with a relatively narrow front portion and a relatively wide back portion. The nozzle 47 is positioned at the first water outlet 13, and the installation bracket 46 and an inner wall of the first water outlet 13 clamp the nozzle 47. A front end of the nozzle 47 is provided with a water spray opening 471, and a rear end of the nozzle 47 is provided with a third water inlet 472. The second water outlet 41 of the second part 44 is provided in the third water inlet 472 through the installation bracket 46, so that the first water inlet 12, the first accommodating cavity 11, the second water inlet 42, the first part 43, the third water outlet 431, the second part 44, the second water outlet 41, the third water inlet 472, and the water spray opening 471 are in communication sequentially. Furthermore, the first part 43 includes a bottom shell 432 and an upper shell 433. The bottom shell 432 is connected to the waterproof inner container 3, and the second water inlet 42 is provided on the upper shell 433. The bottom shell 432 is provided with an installation chamber 4331, and the fan blade 24 is installed in the installation chamber 4331. The bottom shell 432 is also provided with a third installation opening 38, and the upper shell 433 detachably covers the third installation opening 38. Through the above structure, the installation of the fan blade 24, the water flow channel 4, and the nozzle 47 is effectively achieved, so that the fan blade 24 can drive the water flow to pass through the first water inlet 12, the first accommodating cavity 11, the second water inlet 42, the first part 43, the third water outlet 431, the second part 44, the second water outlet 41, the third water inlet 472, and the water spray opening 471 in sequence, and to be sprayed out through the water spray opening 471. The pressure of the water flow sprayed out through the water spray opening 471 acts on the user's skin, relaxing the user's muscles and bones throughout the body to relieve pressure, and at the same time massaging acupoints throughout the body, thereby helping to open up the meridians of the human body to achieve exercise effect, promote health, easily eliminate fatigue for the day, and achieve hydrotherapy effect.

In this embodiment, a fourth installation opening 4331 is defined in the upper shell 433, and one end of an airflow channel 6 with a first air outlet 62 is provided in the installation chamber 4331 through the fourth installation opening 4331 and the third installation opening 38. Through the above structure, the installation of the airflow channel is effectively achieved, which facilitates the mixing of airflow and water flow into bubbly water flow in the installation chamber and the first accommodating cavity.

In this embodiment, the hydrotherapy machine further includes a connecting bracket 5. The connecting bracket 5 is detachably connected to the outer shell 1, so as to detachably connect the outer shell 1 to an external component. Through the above structure, the connecting bracket 5 can connect and fix the hydrotherapy machine in external environments such as bathtubs, effectively achieving the installation of the hydrotherapy machine. Moreover, due to the detachable connection between the connecting bracket 5 and the outer shell 1, so that the outer shell 1 is detachably connected to the external component, making it easier for the user to move the hydrotherapy machine to more scenarios for use. For example, the connecting bracket 5 can also be connected to external environments such as swimming pools, so that the user can use the hydrotherapy machine in swimming pools and other environments.

In this embodiment, the connecting bracket 5 includes an installation shell 51 and at least one first connecting portion 52. The installation shell 51 is connected to the outer shell 1, and the first connecting portion 52 is connected to the installation shell 51. The first connecting portion 52 is used for connecting the installation shell 51 and the outer shell 1 to the external component. The installation shell 51 includes a first shell 511 and a second shell 512. The second shell 512 is detachably connected to the first shell 511. The first shell 511 is equipped with a fixing ring 513, and the outer shell 1 is equipped with a fixing groove 15. The fixing ring 513 is connected to the fixing groove 15. The second shell 512 is equipped with a sliding groove 514, and the first connecting portion 52 includes a suction cup 521 and a first installation portion 522. The first installation portion 522 is connected to a back surface of the suction cup 521, and a front surface of the suction cup 521 is used for being attached and connected to the external component. The first installation part 522 is equipped with a first stop edge 523 and a second stop edge 524. A position limiting space 525 is formed between the first stop edge 523 and the second stop edge 524. The first installation part 522 slides into the sliding groove 514, and the first stop edge 523 and the second stop edge 524 stop the second shell 512 in the position limiting space 525. Specifically, a blocking plate 515 is also provided on the first shell 511. When the second shell 512 is connected to the first shell 511, the blocking plate 515 is used for stopping the first installation portion 522 in the sliding groove 514, so as to stop the suction cup 521 in the sliding groove 514. Furthermore, a total number of the first connecting portions 52 is at least two, and the at least two first connecting portions 52 are arranged uniformly along the connecting bracket 5 in sequence. Through the above structure, the installation of the suction cup 521 has been effectively completed. The user can attach the hydrotherapy machine to external environments such as bathtubs or swimming pools through the suction cup 521 of the connecting bracket 5 for use. The design is reasonable, the connection is stable, and it is easy for the user to install.

In this embodiment, the hydrotherapy machine further includes an airflow channel 6. The outer shell 1 is provided with a first air inlet 16, and the airflow channel 6 includes a second air inlet 61 and a first air outlet 62. The second air inlet 61 is in communication with the first air inlet 16, and the first air outlet 62 is in communication with the first accommodating cavity 11 and the first water outlet 13. Through the above structure, gas can sequentially enter the first accommodating cavity 11 and the first water outlet 13 through the first air inlet 16, the second air inlet 61, the airflow channel 6, and the first air outlet 62 sequentially, and mix with the water entering the first accommodating cavity 11 from the first water inlet 12 to form a bubbly water flow. Through the rotation of the fan blade 24, the bubbly water flow is driven to spray out through the first water outlet 13. Fluctuation of strong oxygen bubbles in the bubbly water flow can improve human metabolism, promote blood circulation, help eliminate waste in the body and toxins in liver and kidney, activate cells throughout the body, and improve physical fitness.

In this embodiment, the hydrotherapy machine further includes a push button 63. The push button 63 is slidably connected to the second air inlet 16 of the airflow channel for sliding to open or close the second air inlet 61. A surface of the push button 63 is also provided with a plurality of anti-slip protrusions 631. Through the above structure, when the user wants to mix the gas to form a bubbly water flow, the push button 63 can be pushed to open the second air inlet 61, so that the gas can mix with the water flow in the first accommodating cavity 11 through the airflow channel 6 to form the bubbly water flow. When the user does not want the water flow to have bubbles, the push button 63 can be pushed to close the second air inlet 61, and only regular water flow is used for hydrotherapy, which can meet different needs of the user.

In this embodiment, the outer shell 1 includes a handle part 17 and a spraying part 18. The handle part 17 is connected to the spraying part 18, and the handle part 17 and the spraying part 18 are arranged at an acute angle, an obtuse angle, or a right angle. The waterproof inner container 3 is positioned inside the handle part 17. The fan blade 24 and the water flow channel 4 are both positioned inside the spraying part 18. Through the above structure, the design is reasonable, the structure is simple, the connection is stable and compact, and the arrangement of the outer shell 1, the waterproof inner container 3, the water flow channel 4, and drive component 2 is effectively achieved.

In this embodiment, the first water outlet 13 is positioned at one end of the spraying part 18, and the first water inlet 12 is positioned at an opposite end of the spraying part 18. The fixing groove 15 is positioned at the handle part 17. The first air inlet 16 is positioned at the handle part 17. The fixing groove 15 is positioned between the first air inlet 16 and the first water inlet 12. Through the above structure, the fixing ring 513 of the connecting bracket 5 is connected to the fixing groove 15, with a reasonable and compact design, effectively achieving the arrangement of the first air inlet 16, the connecting bracket 5, the fixing groove 15, the first water inlet 12 and the first water outlet 13.

In this embodiment, the nozzle is rotatable within the first water outlet to adjust an spray angle of the water spray opening. The hydrotherapy machine further includes a front installation cover 7. The front installation cover 7 is provide with a sleeving opening 71. The sleeving opening 71 is sleeved on the nozzle, and the front installation cover closes the first water outlet to stop the nozzle inside the first water outlet.

In this embodiment, the hydrotherapy machine further includes a back installation cover 8. The back installation cover 8 closes the first water inlet, and a plurality of water inlet holes 81 are defined in the back installation cover 8. The hydrotherapy machine further includes a filter screen 9. The filter screen 9 is positioned between the back installation cover and the first water inlet.

In this embodiment, the push button 63 is slidably connected to an outer side wall of the waterproof inner container.

In this embodiment, the drive shaft 231 of the drive motor 23 is threaded out of the second accommodating cavity 31 through the first installation opening 32, and is connected to the fan blade 24 through a first connecting member 2311.

In this embodiment, the hydrotherapy machine further includes a third sealing member 101. The hydrotherapy machine further includes a waterproof inner container 3. The waterproof inner container 3 is positioned inside the first accommodating cavity 11, and the waterproof inner container 3 is provided with the sealed second accommodating cavity 31 and the first installation opening 32 in communication with the second accommodating cavity 31. The power supply 22 and the drive motor 23 are both positioned inside the waterproof inner container 3, and the drive shaft 231 of the drive motor 23 is threaded out of the second accommodating cavity 31 through the first installation opening 32 to be connected to the fan blade 24. The waterproof inner container is equipped with a waterproof base 102 and a waterproof upper cover 103. The waterproof upper cover 103 is detachably connected to the waterproof base 102. The third sealing member 101 is provided between the waterproof upper cover 103 and the waterproof base 102, so that the third sealing member 101 seals a gap between the waterproof upper cover 103 and the waterproof base 102 to form the sealed second accommodating cavity 31. Through the above structure, the hydrotherapy machine can relax muscles and bones of the whole body to relieve pressure, and massage acupoints throughout the body at the same time, so as to help to open up meridians of the human body to achieve exercise effects, promote health, and easily eliminate fatigue for the day. At the same time, the hydrotherapy machine can drive the water in the bathtub to flow. When there are substances such as fragrance or shower gel placed in the bathtub, the substances such as fragrance or shower gel can be helped to bubble, thereby increasing the user's enjoyment during bathing. Moreover, since the power supply, the drive motor, the control motherboard and other electronic components of the hydrotherapy machine are all positioned inside the waterproof inner container, when the hydrotherapy machine is placed in the water in the bathtub for a long time, the water can be effectively prevented from seeping into the power supply, the drive motor, the control motherboard and other electronic components of the hydrotherapy machine to prevent the hydrotherapy machine from short circuits. This not only greatly improves the service life of the hydrotherapy machine, but also makes it safer to use. Furthermore, since the power supply is provided inside the hydrotherapy machine to supply power to the drive motor of the hydrotherapy machine, the hydrotherapy machine can be used normally even without an external power supply, meeting needs of the user for different usage scenarios.

In this embodiment, a first sealing groove 1021 is defined in the waterproof base 102. A first sealing protrusion 1031 is provided on the waterproof upper cover 103. The third sealing member 101 is provided inside the first sealing groove 1021. The first sealing protrusion 1031 is detachably connected to the first sealing groove 1021, and the first sealing protrusion 1031 presses the third sealing member 101 against an inner wall of the first sealing groove 1021, so that the third sealing member 101 seals the gap between the waterproof upper cover 103 and the waterproof base 102 to form the sealed second accommodating cavity 31. An inner wall of the first accommodating cavity extends to form a protruding first position limiting wall 104 and a protruding second position limiting wall 105. A first position limiting groove 106 is formed between the first position limiting wall 104 and the second position limiting wall 105. At least one part of the waterproof upper cover 103 and at least one part of the waterproof base 102 are positioned in the first position limiting groove 106, and the first position limiting wall 104 and the second position limiting wall 105 press the waterproof upper cover 103 against the waterproof base 102. Specifically, the waterproof base 102 extends to form a protruding third position limiting wall 1022, and the first position limiting wall 104 and the second position limiting wall 105 press the waterproof upper cover 103 against the third position limiting wall 1022 of the waterproof base 102. Furthermore, the inner wall of the first accommodating cavity also extends to form a fourth position limiting wall 107. The first position limiting wall 104 and the second position limiting wall 105 are connected through the fourth position limiting wall. The first position limiting wall 104, the second position limiting wall 105, and the fourth position limiting wall surround and form the first position limiting groove 106. Furthermore, the hydrotherapy machine further includes a first sealing member 33. The first sealing member 33 is provided between the drive shaft 231 and the first installation opening 32 to seal the gap between the drive shaft 231 and the first installation opening 32. Furthermore, a sealing opening 331 is defined in the first sealing member. The sealing opening 331 is sleeved on the drive shaft of the drive motor, and an inner wall of the sealing opening 331 is pressed against and seals a surface of the drive shaft of the drive motor, so that the first sealing member seals a gap between the drive shaft and the first installation opening. The first installation opening is defined in the waterproof upper cover 103. The waterproof upper cover 103 is provided with a second sealing groove 1032. The first sealing member is positioned below the first installation opening. The drive motor is provided with a second sealing protrusion 232. The second sealing protrusion 232 is positioned inside the second sealing groove 1032. An output shaft of the drive motor is threaded out of the second accommodating cavity through the second sealing protrusion 232, the second sealing groove 1032, and the first installation opening in sequence. The first sealing member is positioned between the second sealing protrusion 232 and the second sealing groove 1032, and the second sealing protrusion 232 presses the first sealing member against an inner wall of the second sealing groove 1032, so that the first sealing member seals a gap between the second sealing protrusion 232 and the second sealing groove 1032. Furthermore, the hydrotherapy machine further includes a fourth sealing member 108. The waterproof base 102 includes a first base unit 1023 and a second base unit 1024. A fifth installation opening 10231 is defined in the first base unit 1023. The first base unit 1023 detachably covers the fifth installation opening 10231, and the fourth sealing member 108 is positioned between the first base unit 1023 and the second base unit 1024, so that the fourth sealing member 108 seals a gap between the first base unit 1023 and the second base unit 1024. The power supply and the control motherboard are positioned between the first base unit 1023 and the second base unit 1024. An inner wall of the second accommodating cavity also extends to form a protruding fifth position limiting wall 109 and a protruding sixth position limiting wall 1091. A second position limiting groove 1092 is formed between the fifth position limiting wall 109 and the sixth position limiting wall 1091, and the power supply is positioned in the second position limiting groove 1092. Through the above structure, the design is reasonable, the connection is stable, the arrangement of the waterproof inner container is effectively achieved, the installation of the power supply, the control motherboard, and drive motor is completed, and water can be effectively prevented from seeping into the second accommodating cavity of the waterproof inner container. Specifically, the first sealing member, the second sealing member, the third sealing member, and the fourth sealing member are all silicone sealing members or rubber sealing members. Moreover, since the waterproof upper cover and the waterproof base are detachably connected, the first base unit and the second base unit are detachably connected, making it easy for the user to install the drive motor, the power supply, and the control motherboard in the second accommodating cavity.

In this embodiment, the first position limiting wall 104 is pressed against a surface of the waterproof upper cover 103. The second position limiting wall 105 is pressed against a surface of the third position limiting wall 1022. The first position limiting wall 104 extends to form a first support wall 1041. The first support wall 1041 is used for supporting the bottom shell. Through the above structure, since the first support wall supports the bottom shell, the bottom shell can be made more stable, and vibration of the bottom shell can be reduced.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A hydrotherapy machine, comprising:

an outer shell, wherein the outer shell defines a first accommodating cavity, a first water inlet, and a first water outlet; and the first accommodating cavity, the first water inlet, and the first water outlet are in fluid communication with each other;

a drive component, wherein the drive component comprises a control motherboard, a power supply, a drive motor, and a fan blade; the power supply is electrically connected to the drive motor; the drive motor comprises a drive shaft, and the fan blade is mounted on the drive shaft, and the drive motor is configured for rotating the fan blade through rotation of the drive shaft to drive water to pass through the first water inlet and the first water outlet in sequence, thus forming a water flow for hydrotherapy; and a waterproof inner container, wherein the waterproof inner container is positioned inside the first accommodating cavity, the waterproof inner container defines a sealed second accommodating cavity and a first installation opening, and the first installation opening extends into the second accommodating cavity; the power supply and the drive motor are both positioned inside the waterproof inner container; the drive shaft of the drive motor extends out of the second accommodating cavity through the first installation opening, and is connected to the fan blade.

2. The hydrotherapy machine according to claim 1, further comprising a first sealing member, wherein the first sealing member is positioned between the drive shaft and the first installation opening, and is configured for sealing a gap between the drive shaft and the first installation opening.

3. The hydrotherapy machine according to claim 1, further comprising a flexible button panel, wherein the button panel comprises a pressing portion; the waterproof inner container also defines a second installation opening; the control motherboard is positioned at the second installation opening; the control motherboard comprises a button; the pressing portion is positioned above the button; and the button panel is configured for sealing the second installation opening.

4. The hydrotherapy machine according to claim 1, further comprising a magnetic attraction charging head and a second sealing member;

wherein the magnetic attraction charging head is electrically connected to the power supply, the control motherboard, and the drive motor; the waterproof inner container also defines a third installation opening; the magnetic attraction charging head is received in the third installation opening; the second sealing member is provided between the magnetic attraction charging head and an inner wall of the third installation opening to press and seal a gap between the magnetic attraction charging head and the inner wall of the third installation opening; the outer shell defines a charging opening; the charging opening is oriented towards the magnetic attraction charging head; and the magnetic attraction charging head is capable of being connected to an external power supply through the charging opening.

5. The hydrotherapy machine according to claim 3, further comprising a button bracket, wherein the button panel comprises a positioning protrusion; the button bracket defines a positioning groove; the positioning protrusion is connected to the positioning groove; the button bracket is positioned between the button panel and the control motherboard; and a restoration gap is defined between the button panel and the button bracket.

6. The hydrotherapy machine according to claim 5, wherein stop protrusions are arranged on both sides of an inner wall of the second installation opening; stop grooves are defined in both sides of the button panel; the stop protrusions are connected to the stop grooves; and the stop protrusions stop the stop grooves in the second installation opening to stop the button panel in the second installation opening.

7. The hydrotherapy machine according to claim 1, wherein the outer shell further comprises a water flow channel; a first side of the water flow channel defines a second water outlet; a second side of the water flow channel defines a second water inlet; the first water inlet, the first accommodating cavity, the second water inlet, the water flow channel, the second water outlet, and the first water outlet are in fluid communication sequentially; and the fan blade is disposed between the second water inlet and the second water outlet.

8. The hydrotherapy machine according to claim 7, wherein the water flow channel comprises a first part and a second part; the first part is connected to the waterproof inner container; the second water inlet is positioned in the first part; the first part also defines a third water outlet; a first end of the second part is connected to the third water outlet, a second end of the second part is connected to the first water outlet, and the second water outlet is positioned at the second end of the second part; the first water inlet, the first accommodating cavity, the second water inlet, the first part, the third water outlet, the second part, the second water outlet, and the first water outlet are in fluid communication sequentially; the fan blade is positioned inside the first part; the drive shaft of the motor is connected to the fan blade through the second water inlet; and the second part is connected to the third water outlet through a connecting pipe.

9. The hydrotherapy machine according to claim 8, further comprising an installation bracket, wherein the second part is connected to the outer shell through the installation bracket; the hydrotherapy machine further comprises a nozzle with a relatively narrow front portion and a relatively wide back portion; the nozzle is positioned at the first water outlet; the installation bracket and an inner wall of the first water outlet clamp the nozzle; a front end of the nozzle defines a water spray opening; a rear end of the nozzle defines a third water inlet; and the second water outlet of the second part is arranged in the third water inlet through the installation bracket; the first water inlet, the first accommodating cavity, the second water inlet, the first part, the third water outlet, the second part, the second water outlet, the third water inlet, and the water spray opening are in fluid communication sequentially.

10. The hydrotherapy machine according to claim 9, wherein the first part comprises a bottom shell and an upper shell; the bottom shell is connected to the waterproof inner container; the second water inlet is defined on the upper shell; the bottom shell defines an installation chamber; the fan blade is received in the installation chamber; the bottom shell also defines a third installation opening; and the upper shell detachably covers the third installation opening.

11. The hydrotherapy machine according to claim 1, further comprising a connecting bracket, wherein the connecting bracket is detachably connected to the outer shell, and configured to detachably connect the outer shell to an external component.

12. The hydrotherapy machine according to claim 11, wherein the connecting bracket comprises an installation shell and at least one first connecting portion; the installation shell is connected to the outer shell; the first connecting portion is connected to the installation shell; and the first connecting portion is configured for connecting the installation shell and the outer shell to the external component.

13. The hydrotherapy machine according to claim 12, wherein the installation shell comprises a first shell and a second shell; the second shell is detachably connected to the first shell; the first shell is equipped with a fixing ring; the outer shell is equipped with a fixing groove; the fixing ring is connected to the fixing groove; the second shell is equipped with a sliding groove; the first connecting portion comprises a suction cup and a first installation portion; the first installation portion is connected to a back surface of the suction cup; a front surface of the suction cup is configured for being attached and connected to the external component; the first installation part is equipped with a first stop edge and a second stop edge; a position limiting space is formed between the first stop edge and the second stop edge; the first installation part slides into the sliding groove; and the first stop edge and the second stop edge stop the second shell in the position limiting space; a blocking plate is also arranged on the first shell; and when the second shell is connected to the first shell, the blocking plate is configured to stop the first installation portion in the sliding groove, thereby stopping the suction cup in the sliding groove.

14. The hydrotherapy machine according to claim 1, further comprising an airflow channel, wherein the outer shell defines a first air inlet; the airflow channel comprises a second air inlet and a first air outlet; the second air inlet is in air communication with the first air inlet; the first air outlet is in air communication with the first accommodating cavity and the first water outlet.

15. The hydrotherapy machine according to claim 14, further comprising a push button, wherein the push button is slidably connected to the second air inlet of the airflow channel for sliding to open or close the second air inlet; and a plurality of anti-slip protrusions are arranged on a surface of the push button.

16. The hydrotherapy machine according to claim 1, further comprising a third sealing member, wherein the waterproof inner container is equipped with a waterproof base and a waterproof upper cover; the waterproof upper cover is detachably connected to the waterproof base; and the third sealing member is disposed between the waterproof upper cover and the waterproof base, and the third sealing member seals a gap between the waterproof upper cover and the waterproof base to form the sealed second accommodating cavity.

17. The hydrotherapy machine according to claim 16, wherein a first sealing groove is defined in the waterproof base; the waterproof upper cover comprises a first sealing protrusion; the third sealing member is received inside the first sealing groove; the first sealing protrusion is detachably connected to the first sealing groove; the first sealing protrusion presses the third sealing member against an inner wall of the first sealing groove; the third sealing member is configured for sealing the gap between the waterproof upper cover and the waterproof base to form the sealed second accommodating cavity.

18. The hydrotherapy machine according to claim 17, wherein an inner wall of the first accommodating cavity extends to form a protruding first position limiting wall and a protruding second position limiting wall; a first position limiting groove is formed between the first position limiting wall and the second position limiting wall; at least one part of the waterproof upper cover and at least one part of the waterproof base are positioned in the first position limiting groove; the first position limiting wall and the second position limiting wall are configured to press the waterproof upper cover against the waterproof base; the waterproof base extends to form a protruding third position limiting wall; the first position limiting wall and the second position limiting wall are configured to press the waterproof upper cover against the third position limiting wall of the waterproof base; the inner wall of the first accommodating cavity also extends to form a fourth position limiting wall; the first position limiting wall and the second position limiting wall are connected through the fourth position limiting wall; and the first position limiting wall, the second position limiting wall, and the fourth position limiting wall surround and form the first position limiting groove.

19. The hydrotherapy machine according to claim 16, further comprising a first sealing member, wherein the first sealing member is positioned between the drive shaft and the first installation opening to seal a gap between the drive shaft and the first installation opening; a sealing opening is defined in the first sealing member; the drive shaft of the drive motor is engaged in the sealing opening; an inner wall of the sealing opening is pressed against and seals a surface of the drive shaft of the drive motor, and the first sealing member is configured for sealing a gap between the drive shaft and the first installation opening; the first installation opening is defined in the waterproof upper cover; the waterproof upper cover defines a second sealing groove; the first sealing member is positioned below the first installation opening; the drive motor comprises a second sealing protrusion; the second sealing protrusion is positioned inside the second sealing groove; an output shaft of the drive motor extends out of the second accommodating cavity, and passes through the second sealing protrusion, the second sealing groove, and the first installation opening in sequence; the first sealing member is positioned between the second sealing protrusion and the second sealing groove; the second sealing protrusion presses the first sealing member against an inner wall of the second sealing groove, and the first sealing member is configured for sealing a gap between the second sealing protrusion and the second sealing groove.

20. The hydrotherapy machine according to claim 16, further comprising a fourth sealing member, wherein the waterproof base comprises a first base unit and a second base unit; a fifth installation opening is defined in the first base unit; the first base unit detachably covers the fifth installation opening; the fourth sealing member is positioned between the first base unit and the second base unit, and the fourth sealing member is configured for sealing a gap between the first base unit and the second base unit; the power supply and the control motherboard are positioned between the first base unit and the second base unit; an inner wall of the second accommodating cavity also extends to form a protruding fifth position limiting wall and a protruding sixth position limiting wall; a second position limiting groove is formed between the fifth position limiting wall and the sixth position limiting wall; and the power supply is positioned in the second position limiting groove.

* * * * *